(12) United States Patent
Seda

(10) Patent No.: US 6,883,303 B1
(45) Date of Patent: Apr. 26, 2005

(54) AIRCRAFT ENGINE WITH INTER-TURBINE ENGINE FRAME

(75) Inventor: Jorge F. Seda, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 10/615,968

(22) Filed: Jul. 9, 2003

Related U.S. Application Data

(62) Division of application No. 09/997,461, filed on Nov. 29, 2001, now Pat. No. 6,708,482.

(51) Int. Cl.$^7$ ................................................. F02C 7/20
(52) U.S. Cl. ..................................................... 60/226.1
(58) Field of Search ............................... 60/226.1, 791, 60/792, 796, 797; 244/54; 248/554

(56) References Cited

U.S. PATENT DOCUMENTS

| | | | |
|---|---|---|---|
| 3,540,682 A | * | 11/1970 | Dibble et al. ............... 60/226.1 |
| 3,844,115 A | | 10/1974 | Freid |
| 4,558,564 A | | 12/1985 | Bouiller et al. |
| 4,790,133 A | | 12/1988 | Stuart |
| 4,860,537 A | | 8/1989 | Taylor |
| 4,965,994 A | | 10/1990 | Ciokajlo et al. |
| 4,969,325 A | | 11/1990 | Adamson et al. |
| 4,976,102 A | | 12/1990 | Taylor |
| 5,010,729 A | | 4/1991 | Adamson et al. |
| 5,160,251 A | | 11/1992 | Ciokajlo |
| 5,232,339 A | | 8/1993 | Plemmons et al. |
| 5,307,622 A | | 5/1994 | Ciokajlo |
| 5,361,580 A | | 11/1994 | Ciokajlo et al. |
| 5,443,229 A | | 8/1995 | O'Brien et al. |
| 5,452,575 A | | 9/1995 | Freid |
| 5,485,717 A | * | 1/1996 | Williams .................... 60/226.1 |
| 5,634,767 A | | 6/1997 | Dawson |
| 5,813,214 A | | 9/1998 | Moniz et al. |
| 5,860,275 A | | 1/1999 | Newton et al. |
| 6,185,925 B1 | | 2/2001 | Proctor et al. |

* cited by examiner

Primary Examiner—Louis J. Casaregola
(74) Attorney, Agent, or Firm—William Scott Andes; Steven J. Rosen

(57) ABSTRACT

An aircraft engine turbine frame includes a first structural ring, a second structural ring disposed co-axially with and radially spaced inwardly of the first structural ring about a centerline axis. A plurality of circumferentially spaced apart struts extend between the first and second structural rings. Forward and aft sump members having forward and aft central bores are fixedly joined to forward and aft portions of the turbine frame respectively. A frame connecting means for connecting the engine to an aircraft is disposed on the first structural ring. The frame connecting means may include a U-shaped clevis. The frame may be an inter-turbine frame axially located between first and second turbines of first and second rotors of a gas turbine engine assembly. An axial center of gravity of the second turbine passes though or very near a second turbine frame bearing supported by the aft sump member.

5 Claims, 4 Drawing Sheets

AIRCRAFT ENGINE WITH INTER-TURBINE ENGINE FRAME

CROSS REFERENCE TO RELATED APPLICATION(S)

This is a divisional of application Ser. No. 09/997,461 filed on Nov. 29, 2001, now U.S. Pat. No. 6,708,482, which is hereby incorporated by reference herein.

BACKGROUND OF THE INVENTION

1. Field of the Invention

The invention relates to aircraft gas turbine engines and, particularly, for such engines having frames that support the rotors in bearings and are used to mount the engines to the aircraft.

2. Description of Related Art

A gas turbine engine of the turbofan type generally includes a forward fan and booster compressor, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Most of the thrust produced is generated by the fan. Engine frames are used to support and carry the bearings which, in turn, rotatably support the rotors. Conventional turbofan engines have a fan frame, a mid-frame, and an aft turbine frame. Bearing supporting frames are heavy and add weight, length, and cost to the engine.

Large modern commercial turbofan engines have higher operating efficiencies with higher by pass ratio configurations, larger transition ducts between low pressure and high pressure turbines. The frames, especially those located in the engine hot section, are complex and expensive. Other mid-size turbofan engines eliminate one frame by providing HP rotor support through a differential bearing arrangement in which the high pressure rotor rides on the low pressure rotor with an inter-shaft or differential bearing between them. New commercial engine designs are incorporating counter-rotating rotors for improved turbine efficiency. Counter-rotating rotors can have a detrimental impact on high pressure ratio components clearances especially in the hot section which rely on tight clearance control to provide fuel efficiency benefits.

Consequently, a need exists for an alternative bearing support assembly which will avoid the above mentioned drawbacks and reduce, engine, length, weight and cost and tip improve clearance performance.

SUMMARY OF THE INVENTION

An aircraft gas turbine engine turbine frame includes a first structural ring, a second structural ring disposed co-axially with and radially spaced inwardly of the first structural ring about a centerline axis, and a plurality of circumferentially spaced apart struts extending radially between the first and second structural rings. Forward and aft sump members having forward and aft central bores are fixedly joined to forward and aft portions of the turbine frame, respectively. A frame connecting means for connecting the engine to an aircraft is disposed on the first structural ring. The forward and aft central bores may be cylindrical and the frame connecting means may include at least one U-shaped clevis.

One embodiment of the invention is a gas turbine engine assembly wherein the frame is an inter-turbine frame axially located between first and second turbines of first and second rotors, respectively. The first turbine is located forward of the second turbine and the second rotor includes a second shaft which is at least in part rotatably disposed co-axially with and radially inwardly of the first rotor. The second rotor is supported by a respective aftwardmost second turbine frame bearing mounted in the aft central,bore of the aft sump member and the first rotor is partly supported by a respective first turbine frame bearing mounted in the forward central bore of the forward sump member. An axial center of gravity of the second turbine passes though or very near the second turbine frame bearing. In a more particular embodiment of the invention, the second turbine includes a turbine disk assembly having axially adjacent rotor disks interconnected by structural disk forward and aft spacer arms, respectively. The turbine disk assembly is connected to the second shaft at or near the axial center of gravity. A conical shaft extension may be used to drivingly connect the turbine disk assembly to the second shaft. The conical shaft extension is connected to the turbine disk assembly at or near the axial center of gravity. The rotor disks have hubs connected to rims by webs extending radially outwardly from the hubs, each of the rotor disks supports a row of blades supported in the disk rim.

The aft sump member may have a first radius as measured from the engine centerline axis that is substantially greater than a second radius of the forward sump members. The first radius may be in a range of 150 to 250 percent larger than the second radius.

The present invention replaces a turbine rear frame with an outer guide vane assembly that results in cost and weight reduction benefits by using the turbine transition duct spacing to incorporate an inter-turbine frame to rotatably support both HP and LP rotors. Improved clearance performance results from LP shaft critical speed being disengaged from the HP rotor speed influence. Mounting the low pressure turbine bearing between turbines improves clearance performance because the low pressure turbine bearing diameter is increased resulting in increased stiffness of the low pressure turbine support. Increasing the low pressure turbine bearing diameter also results in reduction of the length of the low pressure turbine shaft LP shaft cone.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
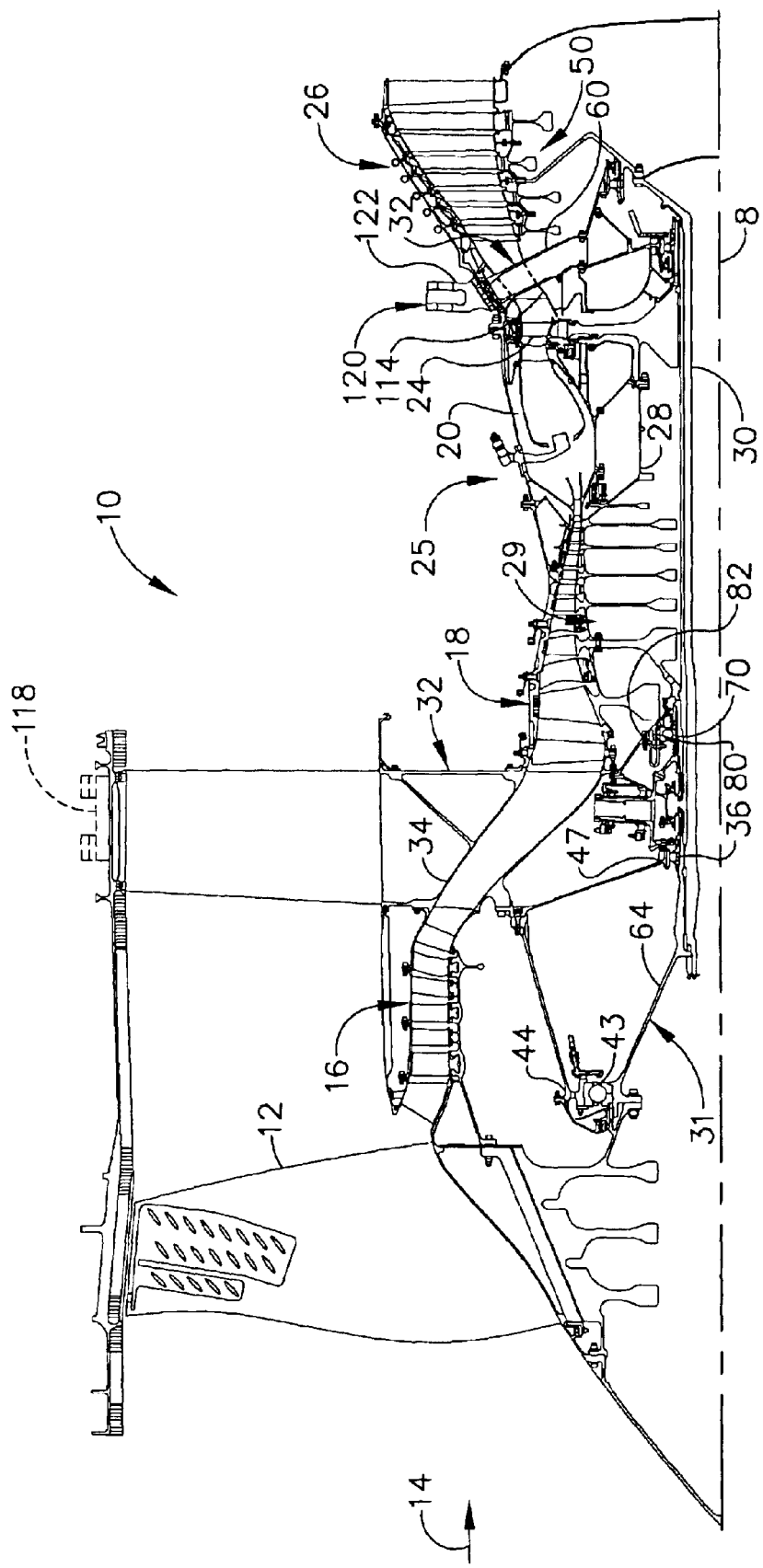
FIG. 1 is a longitudinal, sectional view illustration of exemplary embodiment of an aircraft turbofan gas turbine engine with a low pressure turbine solely supported by an aft frame axially located between the low pressure turbine and a high pressure turbine.
Figure 2:
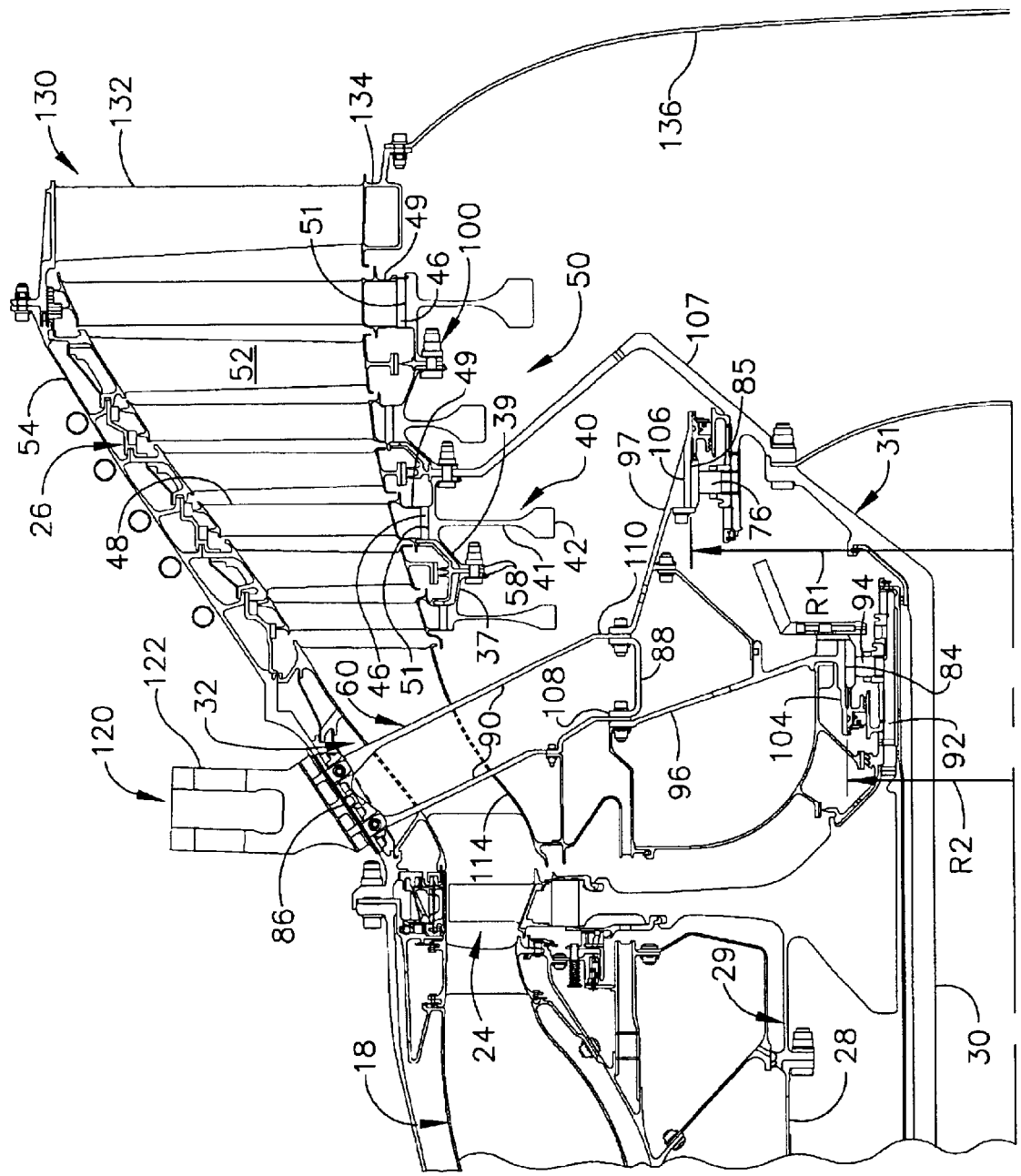
FIG. 2 is an enlarged view of the aft frame and rotors in FIG. 1.

Illustrated schematically in FIGS. 1 and 2 is a first exemplary turbofan gas turbine engine 10 circumscribed about an engine centerline axis 8 and having a fan 12 which receives ambient air 14, a booster or low pressure compressor (LPC) 16, a high pressure compressor (HPC) 18, a combustor 20 which mixes fuel with the air 14 pressurized by the HPC 18 for generating combustion gases which flow downstream through a high pressure turbine (HPT) 24, and a low pressure turbine (LPT) 26 from which the combustion gases are discharged from the engine 10. A first or high pressure shaft 28 joins the HPT 24 to the HPC 18 to substantially form a first or high pressure rotor 29. A second or low pressure shaft 30 joins the LPT 26 to both the fan 12 and the low pressure compressor 16 to substantially form a second or a low pressure rotor 31. The high pressure compressor (HPC) 18, combustor 20, and high pressure turbine (HPT) 24 collectively are referred to as a core engine 25 which includes, for the purposes of this patent, the high pressure shaft 28. The second or low pressure shaft 30 which is at least in part rotatably disposed co-axially with and radially inwardly of the first or high pressure rotor.

The engine 10 has frame structure 32 including a forward or fan frame 34 connected by an engine casing to a mid-engine or inter-turbine frame 60. The engine 10 is mounted within or to an aircraft such as by a pylon (not illustrated) which extends downwardly from an aircraft wing. The turbine frame 60 includes a first structural ring 86, which may be a casing, disposed co-axially about the centerline axis 8. The turbine frame 60 further includes a second structural ring 88 disposed co-axially with and radially spaced inwardly of the first structural ring 86 about the centerline axis 8. The second structural ring 88 may also be referred to as a hub. A plurality of circumferentially spaced apart struts 90 extend radially between the first and second rings 86 and 88 and are fixedly joined thereto. The struts 90 are hollow in the exemplary embodiment of the invention illustrated herein but, in other embodiments, the struts may not be hollow. The engine is mounted to the aircraft at a forwardly located fan frame forward mount 118 on the fan frame 34 and at a rearwardly located turbine frame aft mount 120 on the turbine frame 60. The engine 10 may be mounted below an aircraft wing by a pylon at the forward mount 118 and the aft mount 120 spaced axially downstream from the forward mount 118. The aft mount 120 is used to fixedly join the turbine frame 60 to a platform which is fixedly joined to the pylon. In the exemplary embodiment of the invention illustrated herein, the aft mount 120 includes a U-shaped clevis 122. Conventional mounts often use a set of circumferentially spaced apart set of the U-shaped devises 122 (only one of the U-shaped devises is shown in the cross-sectional illustrations in the FIGS.) on the turbine frame 60. The U-shaped devises 122 are designed to be connected by a set of pins to a set of links. The links are connected to a platform on the bottom of the pylon. The U-shaped devises 122 are one type of frame connecting means for connecting the engine to an aircraft. Other types of mounting means besides clevises are known in the aircraft industry and can be utilized to mount the frame of the present invention and the engine to the aircraft.

A forward end 64 of the low pressure shaft 30 is supported axially and radially from the fan frame 34 by a forward thrust bearing 43 mounted in a first bearing support structure 44 and a second bearing 36, a roller bearing, mounted in a second bearing support structure 47. The first and second bearing support structures 44 and 47 are fixedly attached to the fan frame 34. A conical shaft extension 107 is connected to an aft end of the low pressure shaft 30. The conical shaft extension 107 and the low pressure shaft 30 to which it is connected are supported radially by a third bearing 76 mounted in a third bearing support structure. The third bearing support structure is referred to herein as an aft bearing support structure 97 and is attached to an aft portion 110 of the turbine frame 60. The first rotor 29 is thus most aftwardly rotatably supported by the third bearing 76 which is thus an aftwardmost first rotor support bearing. The turbine frame 60 of the present invention is axially located between the HPT 24 and the LPT 26 and, thus, substantially supports the entire low pressure turbine 26. Because the turbine frame 60 is axially located between first and second turbines of first and second rotors, the HPT 24 and the LPT 26 of the high and low pressure rotors 29 and 31, it is referred to as an inter-turbine frame also sometimes referred to as a mid-engine frame. A transition duct 114 between the HPT 24 and the LPT 26 passes through the inter-turbine frame 60.

A forward HPC end 70 of the HPC 18 of the high pressure rotor 29 is radially supported by a fourth bearing 80 mounted in a fourth bearing support structure 82 attached to the fan frame 34. An aft end 92 of the high pressure rotor 29 is radially supported by a fifth bearing 94 mounted in a fifth bearing support structure referred to herein as a forward bearing support structure 96 attached to a forward portion 108 of the inter-turbine frame 60. Forward and aft bearing support structures 96 and 97 are fixedly joined attached to forward and aft portions 108 and 110 of the inter-turbine frame 60, respectively. Forward and aft sump members 104 and 106 are joined to the inter-turbine frame 60 and carried by forward and aft bearing support structures 96 and 97. The forward and aft sump members 104 and 106 support the fifth bearing 94 and the third bearing 76 in forward and aft cylindrical central bores 84 and 85, respectively, of the sump members. For the purposes of this patent, the fifth bearing 94 and the third bearing 76 in the forward and aft sump members 104 and 106 may be referred to as forward and aft or first and second turbine frame bearings, respectively.

The low pressure turbine (LPT) 26 includes a plurality of rotor disks 40 and each rotor disk 40 has a hub 42 and a web 41 extending radially outwardly from the hub 42 to a rim 46 which defines a perimeter of the rotor disk 40. Each rotor disk 40 supports a row of blades 48, each blade 48 including a dovetail-shaped root portion 49 supported in a slot 51 in the disk rim 46 and stationary rows of vanes 52 extend radially inwardly from case 54 intermediate the rows of rotatable blades 48. Adjacent rotor disks 40 are interconnected by structural disk forward and aft spacer arms 39 and 37, respectively, which are integrally formed as one piece with or rigidly connected to the rim 46 or hub 42 and is transmit bending moments between adjacent disks.

Figure 4:
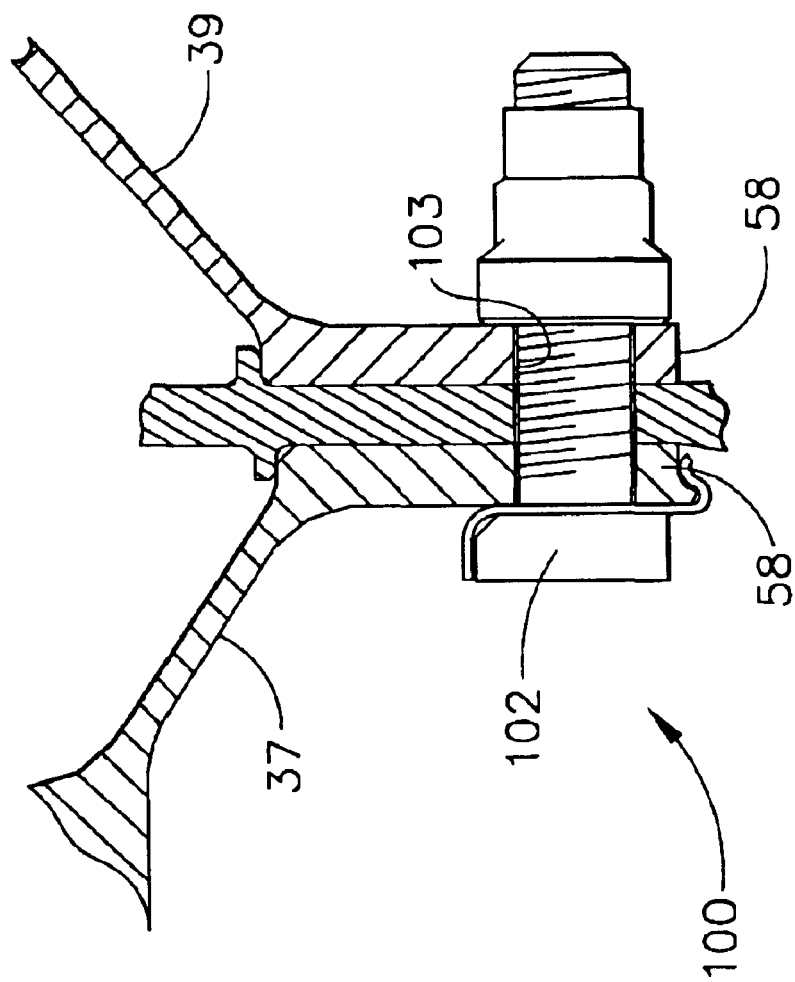
FIG. 4 is an enlarged view of a bolted is connection of disks in of low pressure turbine illustrated in FIG. 2.

In the exemplary embodiment of the invention illustrated herein, the forward and aft spacer arms 39 and 37 are integrally formed as one piece with the disks 40 and bolted together with bolted connections 100 to form a low pressure turbine disk assembly 50 of the low pressure turbine (LPT) 26 as more particularly illustrated in FIG. 4. The forward and aft spacer arms 39 and 37 extend axially forwardly and aftwardly, respectively, away from the disk rim 46 and have radially inwardly extending connecting flanges 58 at spacer arm ends. Adjacent forward and aft spacer arms 39 and 37 are bolted together with the bolted connections 100 having bolts 102 through apertures 103 in the connecting flanges 58. Referring again to FIG. 2, the conical shaft extension 107, also referred to as the low pressure turbine shaft cone, drivingly connects the low pressure turbine disk assembly 50 to the low pressure shaft 30.

The axial location of the third bearing 76 is axially located as close as possible to an axial center of gravity CG of the HPT 24 or the turbine disk assembly 50. Ideally, the axial center of gravity CG of the turbine disk assembly 50 passes though or very near the axial center AC of the third bearing 76. In the exemplary embodiment of the invention illustrated herein, the axial center of gravity CG is close to the bolted connection 100 between the second and third ones of the four rotor disks 40. The shaft extension 107 is connected as close as possible to the axial center of gravity CG of the plurality of rotor disks 40 of the LPT 26 or of the LPT 26 itself. Aft of the LPT 26 is an outlet guide vane assembly 130 which supports a stationary row of outlet guide vanes 132 that extend radially between case 54 and an annular box structure 134. A dome-shaped cover plate 136 is bolted to the annular box structure 134.

The aft sump member 106 has a first radius from the engine centerline axis 8 that is substantially greater than a second radius R2 of the forward sump members 104. The first radius R1 may be in a range of 150 to 250 percent larger than the second radius R2. The aft sump member 106 is located radially from the engine centerline axis 8 a distance that is substantially greater than the distance in similarly sized prior engines. This stiffens the third bearing 76 in the aft central bore 85. These design features improve maneuver clearances by increasing conical shaft extension 107 and stiffness of the third bearing 76 which rotatably supports the LPT 26.

Figure 3:
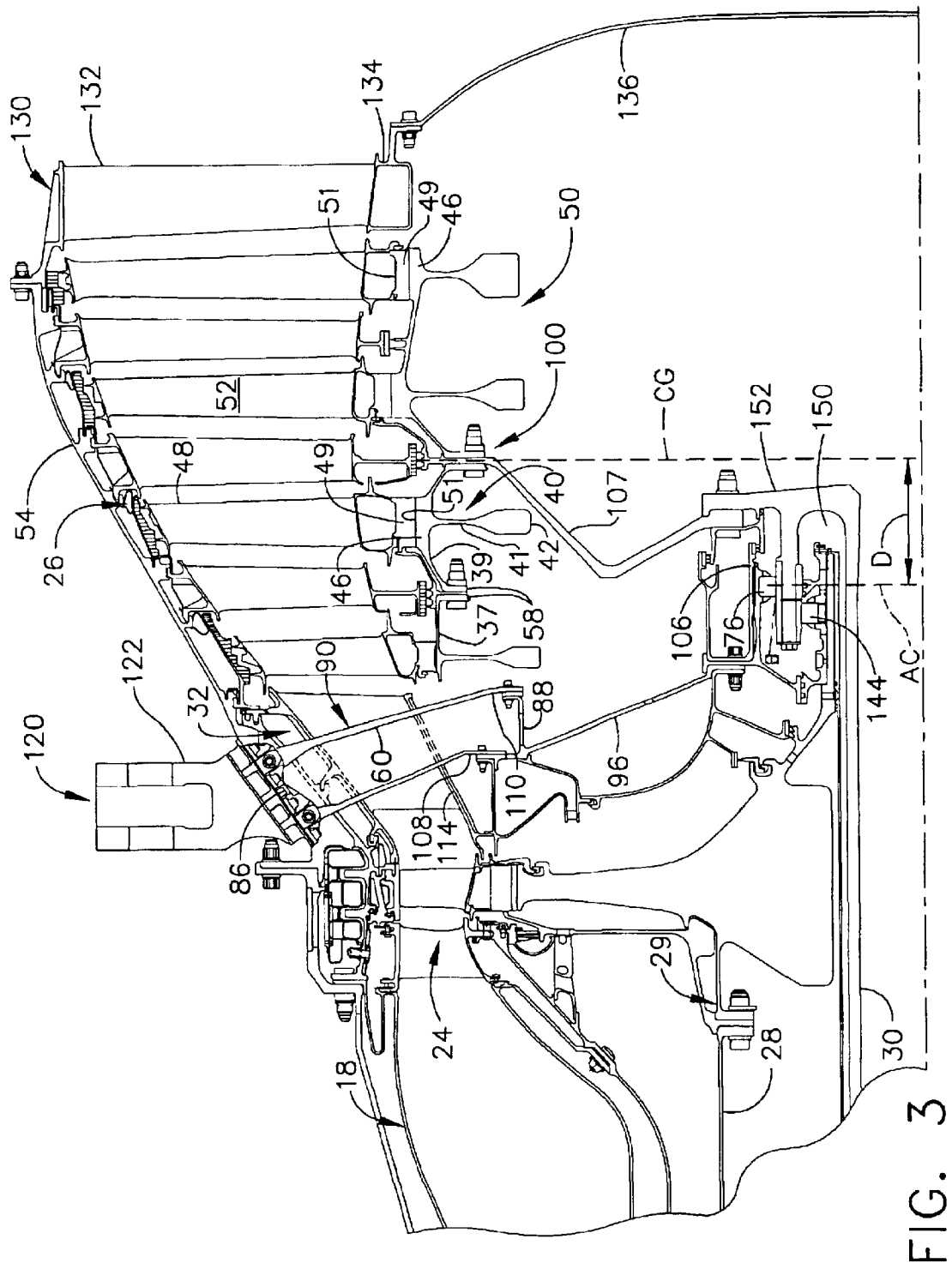
FIG. 3 is an enlarged view of an aft frame and rotors of a second exemplary embodiment of the engine having a differential bearing arrangement supporting the rotors in the inter-turbine frame.

Illustrated schematically in FIG. 3 is an alternative turbofan gas turbine engine configuration in which the turbine frame 60 has only one bearing support structure which is the one referred to as the aft bearing support structure 97 attached to an aft portion 110 of the turbine frame. The low pressure shaft 30 is rotatably supported radially by the third bearing 76 mounted within the aft sump member 106 attached to the turbine frame 60. The aft end 92 of the high pressure rotor 29 is radially supported by a differential bearing 144 (also referred to as an inter-shaft bearing) mounted in an annular recess 150 that is located radially inwardly of the second turbine frame bearing (the third bearing 76). The annular recess 150 axially extends aftward into a radially enlarged portion 152 of the aft end 92 of the low pressure shaft 30. Thus, the third bearing is 76 and the differential bearing 144 are contained within and rotatably supported within the aft sump member 106 attached to the turbine frame 60. This alternative to the turbofan gas turbine engine configuration illustrated in FIG. 2 has only one bearing support structure which is the one referred to as the aft bearing support structure 97 attached to an aft portion 110 of the inter-turbine frame 60. The axial location of the third bearing 76 is not axially located as close as possible to the axial center of gravity CG of the HPT 24 or the turbine disk assembly 50 and instead is spaced a substantial distance D away. In yet another alternative arrangement, the axial location of the third bearing 76 may be axially located as close as possible to the axial center of gravity CG of the HPT 24 or the turbine disk assembly 50. This would result in having the axial center of gravity CG of the turbine disk assembly so pass though or very near the axial center AC of the third bearing 76.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. An aircraft gas turbine engine assembly comprising:

axially spaced apart fan and inter-turbine frames rotatably supporting co-axial high and low pressure rotors, each of said frames comprising a first structural ring and a second structural ring, said second structural ring disposed co-axially with and radially spaced inwardly of said first structural ring about a centerline axis, and a plurality of circumferentially spaced apart struts extending radially between said first and second structural rings, said inter-turbine frame axially located between high and low pressure turbines of said high and low pressure rotors respectively, said high pressure turbine located forward of said low pressure turbine, said low pressure rotor includes a low pressure shaft which is at least in part rotatably disposed co-axially with and radially inwardly of said high pressure rotor, aft sump member having an aft central bore fixedly joined to said inter-turbine frame, said low pressure rotor supported by an aftwardmost bearing mounted in said aft central bore of said aft sump member, said high pressure rotor partly supported by a differential bearing mounted in an annular recess that is located radially inwardly of said aftwardmost bearing, and a frame connecting means for connecting said engine to an aircraft located on said first structural ring.

2. An assembly as claimed in claim 1 wherein said low pressure turbine has an axial center of gravity and is connected to said low pressure shaft at or near said aftwardmost bearing.

3. An assembly as claimed in claim 2 wherein said low pressure turbine includes a turbine disk assembly comprising axially adjacent rotor disks interconnected by structural disk forward and aft spacer arms, respectively, and said turbine disk assembly is connected to said low pressure shaft at or near said axial center of gravity.

4. An assembly as claimed in claim 3 further comprising a conical shaft extension drivingly connecting said turbine disk assembly to said low pressure shaft and said conical shaft extension connected to said turbine disk assembly at or near said axial center of gravity.

5. An assembly as claimed in claim 4 wherein said turbine disk assembly further comprises said disks having pluralities of hubs connected to rims by webs extending radially outwardly from said hubs and each of said rotor disks includes a row of blades supported in said disk rim.

* * * * *